US006860484B2

(12) United States Patent
Urlichs

(10) Patent No.: US 6,860,484 B2
(45) Date of Patent: Mar. 1, 2005

(54) ROTOR SEAL WITH FOLDING STRIP

(75) Inventor: Karl Urlichs, Nürnberg (DE)

(73) Assignee: Alstom (Switzerland) Ltd., Baden (CH)

( * ) Notice: Subject to any disclaimer, the term of this patent is extended or adjusted under 35 U.S.C. 154(b) by 0 days.

(21) Appl. No.: 10/217,224

(22) Filed: Aug. 12, 2002

(65) Prior Publication Data

US 2003/0071423 A1 Apr. 17, 2003

Related U.S. Application Data

(63) Continuation of application No. PCT/EP01/01539, filed on Feb. 12, 2001.

(30) Foreign Application Priority Data

Feb. 12, 2000 (DE) .......................... 100 06 298

(51) Int. Cl.[7] .............................................. F16J 15/447
(52) U.S. Cl. ..................... 277/412; 277/355; 277/578
(58) Field of Search ................. 277/412, 355, 277/404, 411, 500, 578; 415/173.3, 173.5, 174.2

(56) References Cited

U.S. PATENT DOCUMENTS

| | | | | | |
|---|---|---|---|---|---|
| 2,871,038 | A | * | 1/1959 | Comery ..................... 277/421 |
| 3,561,776 | A | * | 2/1971 | Wilson ........................ 277/647 |
| 3,694,882 | A | * | 10/1972 | Desmond ................... 29/889.2 |
| 3,744,805 | A | * | 7/1973 | Heinrich ..................... 277/400 |
| 4,227,745 | A | * | 10/1980 | Enchelmaier ................. 300/2 |
| 4,526,509 | A | * | 7/1985 | Gay et al. ................. 415/173.3 |
| 4,548,416 | A | * | 10/1985 | Maeda ......................... 277/444 |
| 4,797,076 | A | * | 1/1989 | Eiermann ................... 418/142 |
| 4,906,109 | A | * | 3/1990 | Balsells ......................... 384/26 |
| 5,108,078 | A | * | 4/1992 | Balsells ....................... 267/167 |
| 5,265,890 | A | * | 11/1993 | Balsells ....................... 277/467 |
| 6,109,616 | A | * | 8/2000 | Mayr .......................... 277/355 |
| 6,267,381 | B1 | * | 7/2001 | Wright ........................ 277/355 |

FOREIGN PATENT DOCUMENTS

| | | |
|---|---|---|
| DE | 44 03 605 C2 | 8/1995 |
| DE | 100 06 298 A1 | 8/2001 |
| EP | 0 933 567 A2 | 8/1999 |
| GB | 2 026 627 A | 2/1980 |
| JP | 10 196 801 A | 7/1998 |
| WO | WO 00/03164 | 1/2000 |

OTHER PUBLICATIONS

Kalpakjian, S. Manufacturing Enginnering and Technology. (New York, AddisonWesley, 1995), pp.141–144.*

* cited by examiner

Primary Examiner—Robert J. Sandy
Assistant Examiner—Thomas Ho
(74) Attorney, Agent, or Firm—Laurence A. Greenberg; Werner H. Stemer; Ralph E. Locher

(57) ABSTRACT

A rotor seal, especially for turbo engines, is described. The sealing elements are folded from a pleated band and are connected to each other even when the rotor seal is in the assembled state. The barrier effect of the inventive rotor seal is thus increased in relation to lamella seals that always require a gap between the individual lamella.

22 Claims, 5 Drawing Sheets

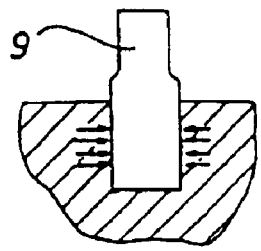 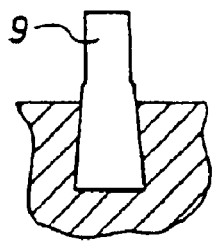 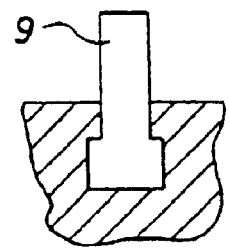 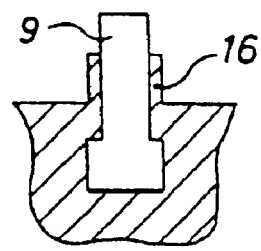
Fig. 6A  Fig. 6B  Fig. 6C  Fig. 6D
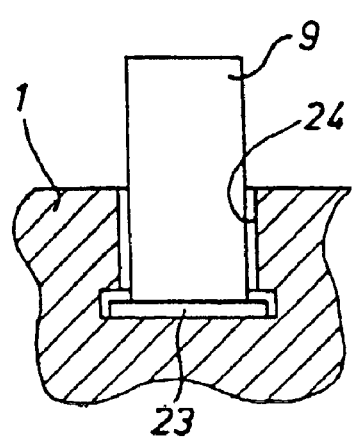 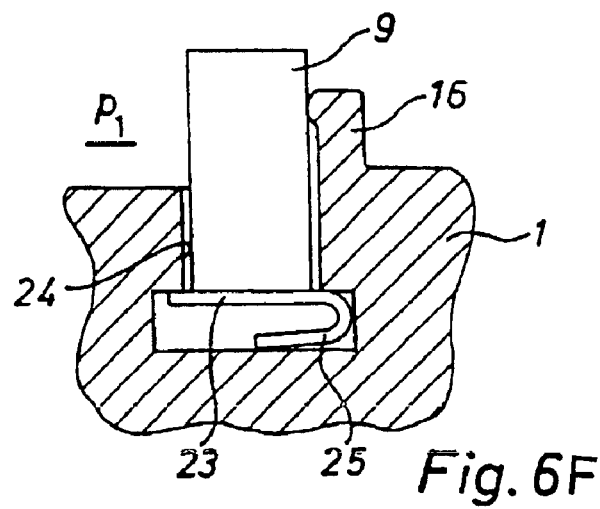
Fig. 6E  Fig. 6F
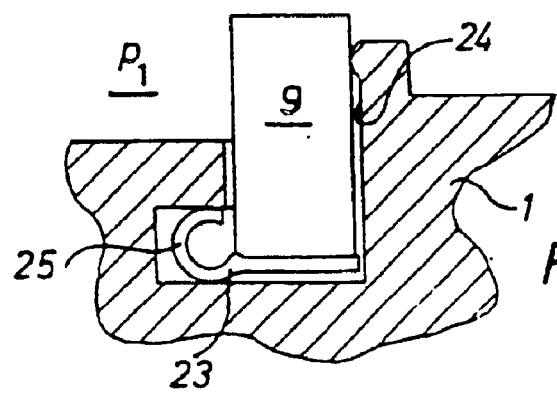
Fig. 6G

ROTOR SEAL WITH FOLDING STRIP

CROSS-REFERENCE TO RELATED APPLICATION

This application is a continuation of copending International Application No. PCT/EP01/01539, filed Feb. 12, 2001, which designated the United States and was not published in English.

BACKGROUND OF THE INVENTION

FIELD OF THE INVENTION

The invention relates to a rotor seal, in particular for turbomachines, for sealing a sealing gap which is present between a stationary housing and a rotor that rotates relative to the housing. The rotor seal has sealing elements disposed one behind the other in the circumferential direction of the rotor.

A rotor seal of this type is known, for example, from International Patent Disclosure WO 00 03 164 A1, Published, European Patent Application EP 09 33 567 A2 or German Patent DE 44 03 605 C2. In the case of the lamellar seal described in DE 44 03 605 C2, the lamellae are folded from a strip material in such a way that folded edges are located at the beginning and end of the prospective lamellae. After folding, the strip material, which has been folded in concertina form, is brought into the desired shape and the strip material is cut at the folded edges, so that individual lamellae that seal the sealing gap between the housing and rotor are formed.

A drawback of the lamellar seal, and also of all other lamellar seals, is that there must inevitably be a space between the individual lamellae, in order to ensure sufficient elasticity of the lamellae in the radial direction. If this elasticity is not ensured, the lamellar seal becomes worn very quickly when the rotor, for example as a result of thermal expansion, moves out of its central position with respect to the lamellar seal. Moreover, fluid can flow through the gaps that are present between the lamellae, which reduces the sealing effect of the lamellar seal.

SUMMARY OF THE INVENTION

It is accordingly an object of the invention to provide a rotor seal with a folding strap that overcomes the above mentioned disadvantages of the prior art devices of this general type, which has a sealing performance that is improved compared to lamellar seals and which withstands higher compressive loads. Moreover, it should be possible for the compressive force, elasticity and sealing action of the rotor seal according to the invention to be adapted in a simple manner to a very wide range of requirements.

With the foregoing and other objects in view there is provided, in accordance with the invention, a rotor seal for sealing a sealing gap present between a stationary housing and a rotor that rotates relative to the stationary housing. The rotor seal contains a folding strip being folded into a plurality of sealing elements disposed one behind another other in a circumferential direction of the rotor. The folding produces folded edges and the folded edges, in an installed state of the folding strip, run in a plane lying perpendicular to a rotor axis.

Possible application areas of the rotor seal according to the invention are turbomachines, such as steam turbines, gas turbines and compressors. However, the application of the rotor seal according to the invention is not restricted to the above-mentioned application areas.

In the case of turbomachines, it is important to provide a seal at the compensation piston, at the rotor outlets and at the blading, such that very small sealing gaps are possible despite non-steady-state thermal expansions or rotor displacements. The use of the rotor seal according to the invention is highly beneficial in turbomachines, since their efficiency increases if, despite the large radial thermal expansions that occur there, it is possible to have smaller sealing gaps.

The fact that a plurality of lamellae are folded from one folding strip results in that there is no longer any gap between the sealing elements, and consequently the sealing action of the rotor seal according to the invention is increased considerably compared to known lamellar seals. The rotor seal according to the invention can be used even for very high-pressure differences if the width, number of folds, setting angle and material thickness of the folding strip are selected accordingly. Moreover, the rotor seal according to the invention with a folding strip can be produced more easily and fitted more easily than a conventional lamellar seal.

In the rotor seal according to the invention, the sealing gap is very small under all operating conditions. After a brief spell of stripping, for example as a result of rotor oscillations or thermal expansions, the rotor seal according to the invention springs back into the starting position without being damaged. The elasticity of the rotor seal according to the invention is great in the radial direction.

In a further configuration of the invention, it is provided for the strip material to be folded along parallel folded edges and for the folding to take place in the opposite direction at two adjacent folded edges, so that any desired number of sealing elements can be produced integrally by folding a folding strip. In this way, the production of different sizes of rotor seals from an endless folding strip can easily be effected by varying the number of sealing elements that are folded onto one another.

In a variant of the invention, it is provided for the two parallel longitudinal edges of the folding strip and the parallel folded edges to include a production angle of <90°. The production angle is dependent on a pitch and width of the rotor seal. In this embodiment of the invention, the folded edges, in the installed state, do not run radially with respect to the axis of rotation of the rotor, but rather are inclined to a greater or lesser extent with respect to the surface of the rotor.

In an advantageous variant of the invention, there is provision for the folded edges, in the installed state, to include a setting angle $\gamma$ of between 10° and 70°, particularly preferably between 20° and 45°, with a radius which originates from the rotor axis, so that the rotor seal according to the invention is on the one hand sufficiently elastic to be able to compensate for relative movements in the radial direction between the rotor and the housing and on the other hand has sufficient dimensional stability to provide a reliable seal under all operating conditions. Consequently, the sealing elements can easily be deflected in the radial direction of the axis of rotation of the rotor and can therefore easily compensate for relative movements in the radial direction between the rotor and the housing. The rigidity of the rotor seal according to the invention can easily be varied within wide limits according to the choice of the setting angle.

In this embodiment of the rotor seal according to the invention, the contact line between the sealing elements and the rotor does not, as in conventional lamellar seals, run parallel to the rotor axis, but rather runs as a zigzag line in the circumferential direction of the rotor.

In another configuration of the invention, a slit is provided in the region of the folded edges. A depth of the slit is less than the width of the folding strip, so that it is ensured that the sealing elements are held together even after slitting of the folding strip.

The operating performance of the rotor seal according to the invention changes according to which folded edges of the folding strip are slit. In the installed state, the folded edges lie in two parallel planes, one plane lying closer to the interior of the housing, which is at an increased pressure compared to ambient pressure, and the other plane-lying closer to the outer side of the housing.

If the folded edges that lie in the plane that lies closer to the interior of the housing are slit, a pressure increase in the interior of the housing causes the slits to close up, so that the sealing action is improved. If the folded edges that lie in the other plane are slit, a pressure increase in the interior of the housing causes the slits to open, so that there is protection against unacceptably high pressures.

In a further addition to the invention, the rotor seal, at its end that is remote from the sealing gap, has a carrier ring, so that the rotor seal can easily be connected to the housing or, if the rotor seal is to rotate with the rotor, to the rotor.

In a further configuration of the invention, the carrier ring has a sealing lip, so that a secondary leakage between the carrier ring and the housing or the rotor is reduced or eliminated. The sealing lip may also be configured as a latching element, so that the rotor seal according to the invention can be latched into a correspondingly shaped mating part of the housing or of the rotor.

In a further addition to the invention, there is provision for the strip material to be formed of a metallic material and/or for the strip material to be plastically deformable in the region of the folded edges and for the strip material otherwise to be resilient, so that the rotor seal can be used over a wide temperature range, has a high ability to withstand temperature and pressure, and moreover has a long service life.

To facilitate folding, the folding strip can be soft-annealed in the region of the folded edges.

In the folded state, the folding strip can be connected to a seal carrier in a force-locking or form-locking manner or by material-to-material bonding. In turn, the seal carrier can easily be connected to the housing or, if the rotor seal is to rotate, to the rotor. Therefore, an optimum connection between the folding strip and the seal carrier can be achieved according to the requirements imposed on the rotor seal.

In a particularly advantageous configuration of the invention, a recess is provided in the region of the folded edges, it being possible for the recess to be connected in a form-locking manner to a suitably shaped annular groove in a seal carrier, so that the sealing elements can be pushed into the annular groove in the longitudinal direction thereof and the form-lock prevents radial movement of the sealing elements relative to the seal carrier.

To further simplify the installation of the sealing elements, the seal carrier may be of a multipart configuration.

To further simplify installation, it is also possible for the parting plane of the seal carrier to run substantially parallel to the folded edges in the region of the parting plane.

In an advantageous embodiment of the invention, the seal carrier is secured to the housing, so that the rotor seal is only exposed to compressive loads.

In another configuration of the invention, the seal carrier is secured to the rotor, so that the sealing elements are also exposed to centrifugal forces. This effect can be used to make the distance between the sealing elements and the sealing surface on the housing dependent on the rotational speed. This is advantageous in particular if the distance, when the critical speed is passed through, is still sufficiently great to prevent excessive wear to the sealing elements and, when the operating speed is reached, the distance has reduced sufficiently to achieve an optimum sealing action.

A variant of the invention that is particularly suitable in terms of installation is characterized in that the rotor seal contains a plurality of segments, and in that each segment is folded from a folding strip. This embodiment makes it possible to produce even very large rotor seals.

A form-locking connection is one that connects two elements together due to the shape of the elements themselves, as opposed to a force-locking connection, which locks the elements together by force external to the elements.

A force-locking connection is one that connects two elements together by force external to the elements, as opposed to a form-locking connection, which is provided by the shapes of the elements themselves.

In accordance with another feature of the invention, the folding strip is soldered, welded or connected in a form-locking manner to the carrier ring.

In a concomitant feature of the invention, the rotor seal is a radial seal or an axial seal.

Other features which are considered as characteristic for the invention are set forth in the appended claims.

Although the invention is illustrated and described herein as embodied in a rotor seal with a folding strip, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 6A–6G are cross-sectional views of various lamellae;

DESCRIPTION OF THE PREFERRED EMBODIMENTS

Figure 1:
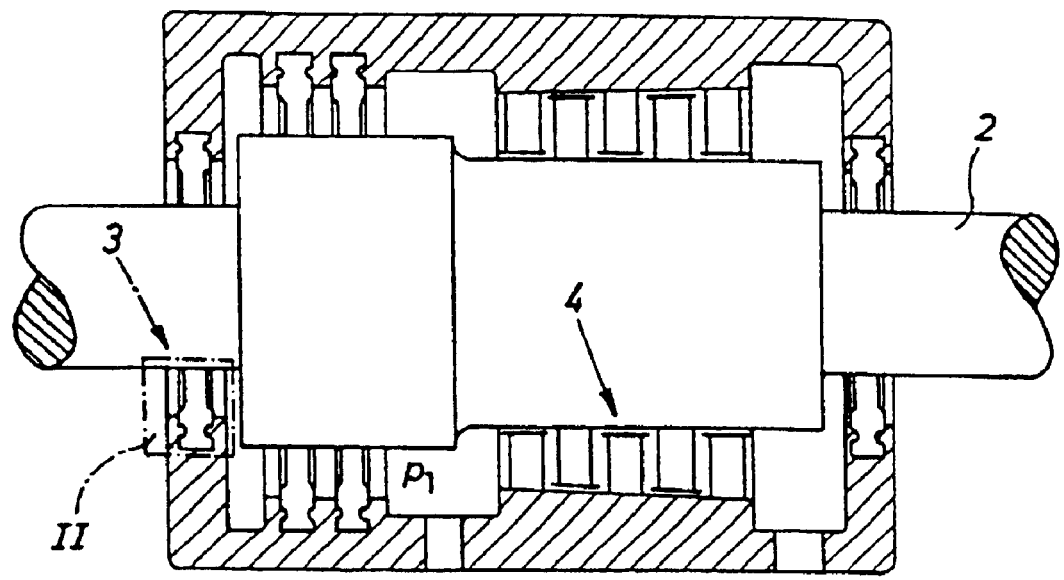
FIG. 1 is a diagrammatic, cross-sectional view through a turbine housing according to the invention.

Referring now to the figures of the drawing in detail and first, particularly, to FIG. 1 thereof, there is shown a cross-sectional view through a turbine housing 1, illustrating various seals 3 and 4 which act with respect to a rotor 2. In the context of the present invention, the term "rotor" is to be understood as meaning all components that rotate relative to a housing or a bearing. An internal pressure $p_1$ prevails in an interior of the housing 1, and an ambient pressure $p_2$ prevails outside the turbine housing 1. The pressure difference $p_1-p_2$ causes leaks between the interior of the housing 1 and the environment.

Figures 2, 3:
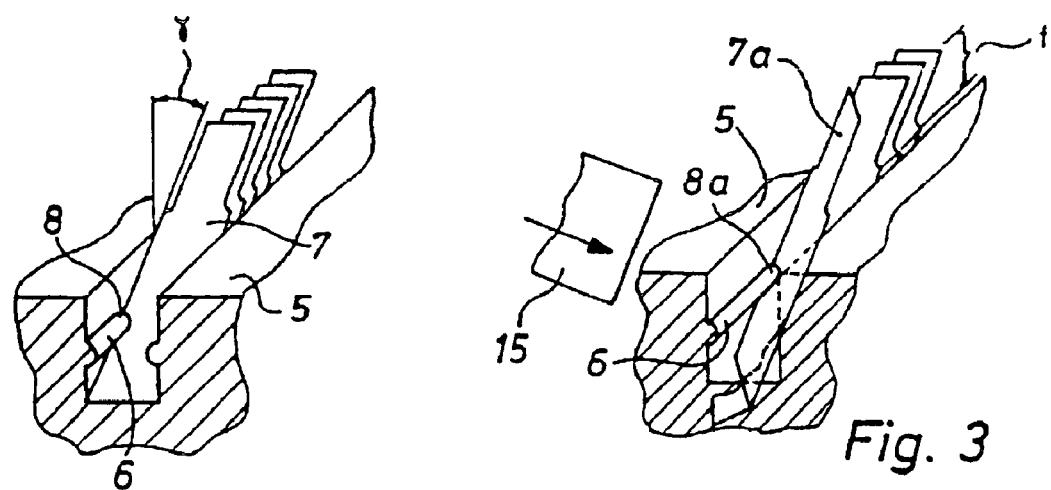
FIG. 2 is a perspective view of a detail II shown in FIG. 1 on an enlarged scale.
FIG. 3 is a perspective view of an illustration of a folding operation during installation of a folding strip.

In FIG. 2, which shows a detail II from FIG. 1 on an enlarged scale and in perspective, an annular groove is introduced into the turbine housing 1 and is used as a seal carrier 5. The groove has, on each of its opposite walls, a contoured projection 6. A multiplicity of individual lamellae 7, which contain metal sheets with a thickness of 0.04 to 0.1 mm, are stacked on top of one another in the annular groove in the seal carrier 5. The lamellae 7 are connected to the seal carrier 5 in a form-locking manner via notches 8 that interact with the projections 6.

The lamellae 7 are inclined at a setting angle $\gamma$ of approximately 45° with respect to the normal to the longitudinal axis of the annular groove. Other forms of the cross sections of the seal carriers 5 are illustrated in FIGS. 6A to 6D.

In principle, a folding strip 9 according to the invention can be secured to the turbine housing 1 in any desired way. The securing should be as elastic and pressure-tight as possible. The radial securing, with a rectangular annular groove as shown in FIG. 6A, is affected by compression, or is produced by the shape of a conical groove as shown in FIG. 6B or a contoured groove as shown in FIGS. 6C and 6D.

In a second embodiment, as shown in FIG. 6E, the folding strip 9 is soldered or welded to a carrier ring 23 or is connected to the latter in a form-locking manner. The carrier ring 23 can now very easily be anchored in an annular groove 24 in the turbine housing 1.

Favorable solutions are achieved if the carrier ring 23 is configured, as shown in FIG. 6F, as a seal with a sealing lip 25. The sealing lip 25 may be configured in such a way that it widens out under the pressure pi that is present, thus improving the sealing action. In a variant of this type, which is particularly suitable for high-pressure differences, the folding strip 9 can be supported by a supporting web 16. This makes it possible in particular to ensure that the stresses at the location where the folding strap 9 is secured to the carrier ring 23 are minimized. In a further variant, as shown in FIG. 6G, deformation of the carrier ring 23 in operation is prevented.

The folding strip 9 with the carrier ring 23 can also be introduced radially into the annular groove 24, and it can there latch in a shoulder. For this purpose, in particular the exemplary embodiment shown in FIG. 6F or 6G with an integrated sealing lip 25 is recommended, since the sealing lip 25 can act as a latching lug and the carrier ring 23 can be latched to the annular groove 24.

To ensure that it is not necessary for each lamella 7 to be manufactured individually and to simplify operations during installation, in accordance with FIG. 3, a plurality of lamellae 7a are produced from the folding strip 9.

The structure of the folding strip 9 is described below with reference to the exemplary embodiments illustrated in FIGS. 4 and 5. The folding strip 9 has two longitudinal edges 13a and 13b parallel to one another. A plurality of folding edges 11 run over the folding strip at a non-illustrated angle that is designated below as a production angle $\beta$. An angle $\alpha$ represents the additional angle between the non-illustrated production angle $\beta$ and a normal 12 to the longitudinal edges 13a and 13b. The choice of the optimum production angle $\beta$ is dependent, inter alia, on the pitch of the folding strip 9. The choice of the production angle $\beta$ makes it easy to adjust the operating performance of the rotor seal 7a.

A bore 14 is introduced at each folded edge 11, at a predeterminable distance from the longitudinal edge 13b of the folding strip 9. As an alternative to the round bore 14 that is illustrated, it is also possible to select other cutouts of any desired contour.

The folding strip 9 is folded directly into the annular groove in the seal carrier 5 (see FIG. 3) along the folded edges 11, in each case in opposite directions, using a calking tool, which is denoted by 15. After the folding, the bores 14 form a virtually semicircular cutout 8a that engages in the correspondingly shaped projection 6 of the seal carrier 5. The folding may also take place outside the seal carrier 5, and the rotor seal 7a formed from the folding strip 9 can then be introduced into the annular groove in the seal carrier 5 in the folded state. However, it is preferable for the folding to be carried out directly during installation using the calking tool 15.

After the rotor seal 7a has been installed, there can be no secondary leaks in the region of the folded edges 11, and consequently a supporting web 16 indicated in FIG. 6D is not required.

Figure 4:
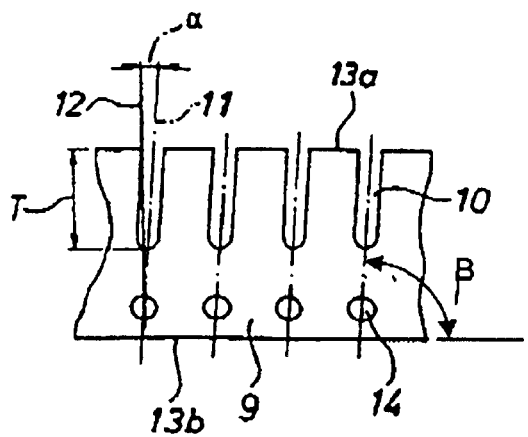
FIG. 4 is a plan view of a first embodiment of a folding strip.

In the exemplary embodiment shown in FIG. 4, the folding strip 9 is provided with slits 10 in the region of the folded edges 11. Longitudinal axes of the slits 10 and of the folded edges 11 run parallel to one another. If, as illustrated in FIG. 4, a slit 10 is provided in the region of each folded edge 11, the operating performance of the rotor seal 7a according to the invention (see FIG. 2) substantially corresponds to that of a conventional lamellar seal. If the slit 10 is not provided at each folded edge 11, the operating performance of the rotor seal according to the invention can be influenced further.

For example, if the slit 10 is only provided at every second folded edge 11, by installing the rotor seal 7a in the turbine housing 1 it is possible to further influence the operating performance. Specifically, if the rotor seal 7a is installed in such a way that the slits 10 face in the direction of the higher pressure, the compressive forces, as the pressure difference $p_1-p_2$ increases, cause the width of the slits 10 to close up. Otherwise, if the rotor seal 7a is installed in such a way that the slits 10 face in the direction of the lower pressure, the compressive forces, as the pressure difference $p_1-p_2$ increases, cause the slits 10 to open up, so that the seal cannot be destroyed by excess pressures.

A further advantage of the folding is that, depending on a depth T of the slits 10 (see FIG. 4) in the folding strip 9 and the thickness of the material of the strip, it is possible to have an influence on the rigidity. Furthermore, the folding ensures a certain minimum gap is present between the individual metal sheets. During installation of the folding strip 9 in the annular groove in the seal carrier 5, fanning out in the radial direction is brought about automatically.

Figure 5:
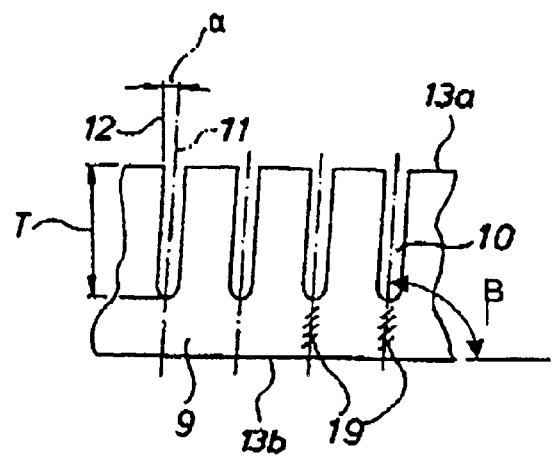
FIG. 5 is a plan view of a second embodiment of the folding strip.

FIG. 5 illustrates a further exemplary embodiment of the folding strip 9 according to the invention. The depth T of the slits 10 is selected in such a way that the bore 14 as in the exemplary embodiment shown in FIG. 4 is not required. In the present exemplary embodiment, the folding strip 9 is locked to the base of the slit 10 at the projection 6 of the angular groove in the seal carrier 5. In this exemplary embodiment, the supporting web 16 as shown in FIG. 6D may be necessary, in order to avoid secondary leakage. FIG. 5 indicates a soft material zone 19, which is produced by heat treatment, in the region of the folded edges 11, making it easier to fold the folding strip 9.

Figure 7:
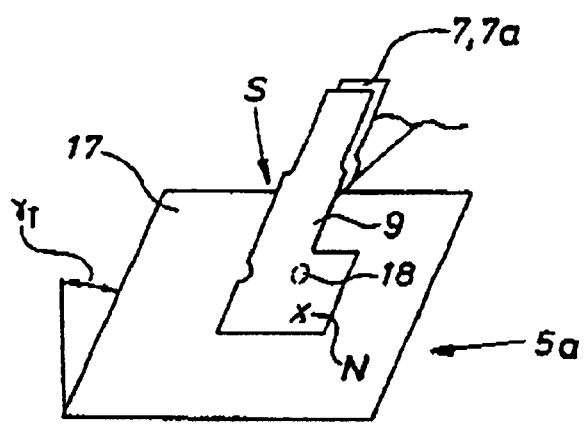
FIG. 7 is an illustration of a partial region of a split seal carrier.

In order for the folding strip 9 to be installed in an annular groove, the latter is provided with a non-illustrated local widening. As indicated in FIG. 7, in the case of installation in a split seal carrier 5a, a parting surface 17 is inclined at an angle $\gamma_T$ with respect to a normal to the longitudinal axis of the annular groove. The angle $\gamma_T$ approximately corresponds to the setting angle $\gamma$ indicated in FIG. 2. In the region of the parting surface 17, the folded folding strip 9 can be prevented from dropping out by a lamella with a protuberance N engaged in the circumferential direction, the protuberance N being secured by a rivet 18 that is introduced into the parting surface 17. Securing by a welded spot, local compression of the groove region, a notched pin or a screw is also possible.

Figure 8:
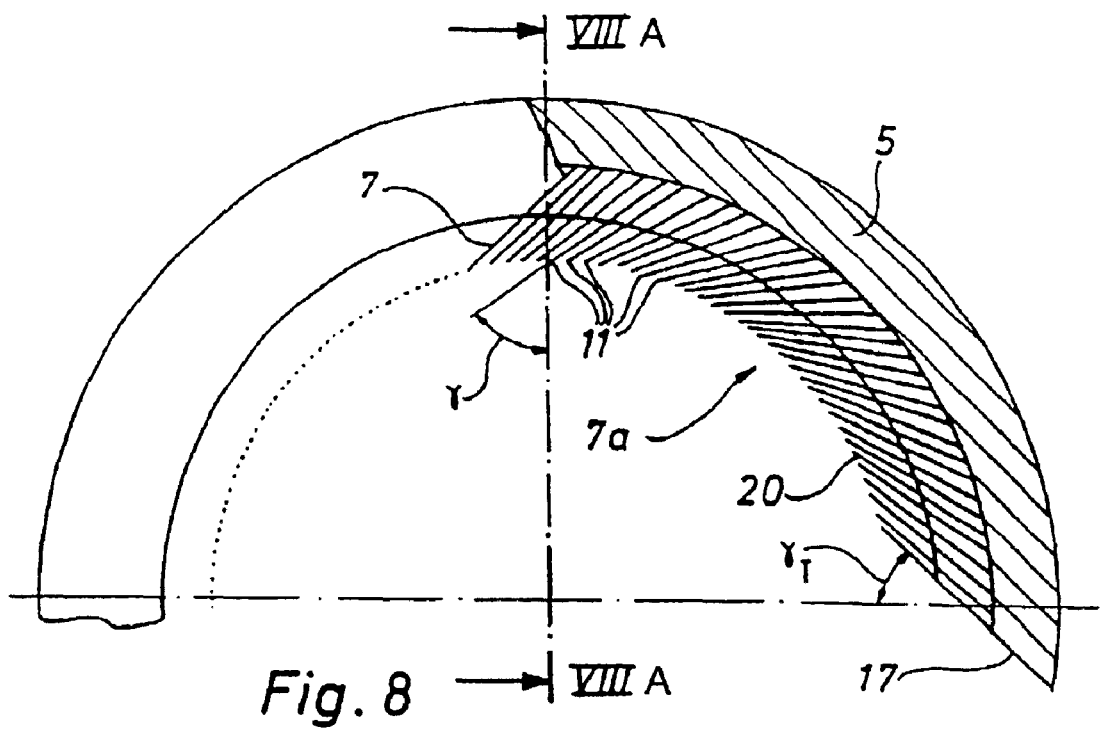
FIG. 8 is an illustration of a configuration of lamellae as seen in an axial direction of a seal carrier.

FIG. 8 shows the fan-shaped configuration of the folded edges 11 in the split seal carrier 5 with a setting angle $\gamma$ of 45°. The angle $\gamma_T$ of the parting surface 17 in this exemplary embodiment corresponds to the setting angle $\gamma$ of the folded edges 11.

Figures 8A, 9:
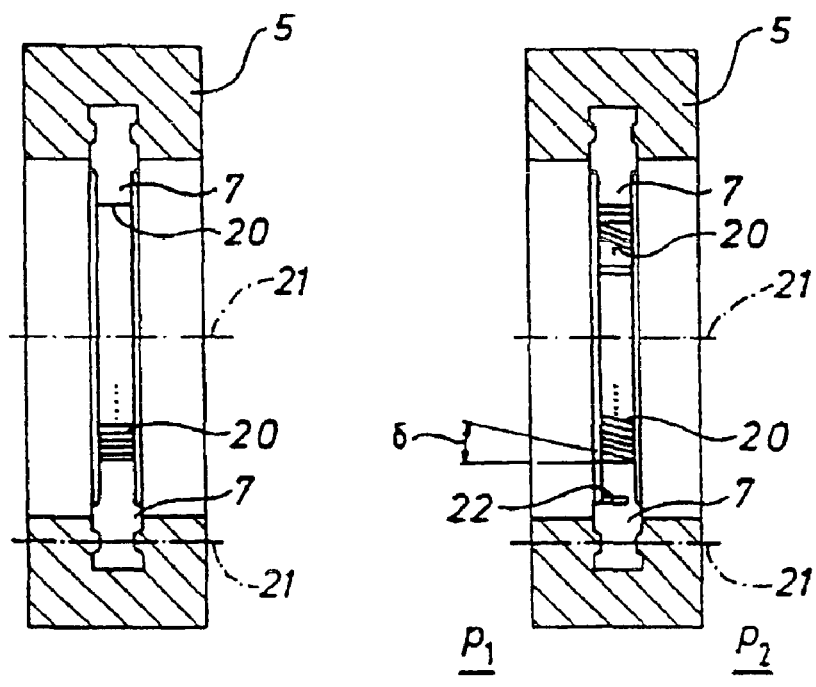
FIG. 8A is a sectional view taken along the line VIIIA—VIIIA shown in FIG. 8.
FIG. 9 is a sectional view of a configuration of the lamellae which differs from that shown in FIG. 8A.

As can be seen from FIG. 8A, end sides 20 of the lamellae, facing the rotor, run parallel to a rotor axis 21.

A further improvement to the sealing performance is achieved by the slightly inclined installation of the lamellae shown in FIG. 9. The inclination is described by an angle of inclination δ between the rotor axis 21 and the end sides 20 of the rotor seal 7a. In the exemplary embodiment shown in FIG. 9, the angle of inclination δ is approximately 10° to 20°. However, the angle of inclination δ is not restricted to this angle range.

The inclination of the end sides 20 makes it possible to achieve the effect which is known from brush seals, according to which the lamellae 7 bear against one another as a result of the pressure difference $p_1$–$p_2$ and as a result of momentum forces. This can also be promoted by a transverse slit 22 in the lamellae 7.

Figure 10:
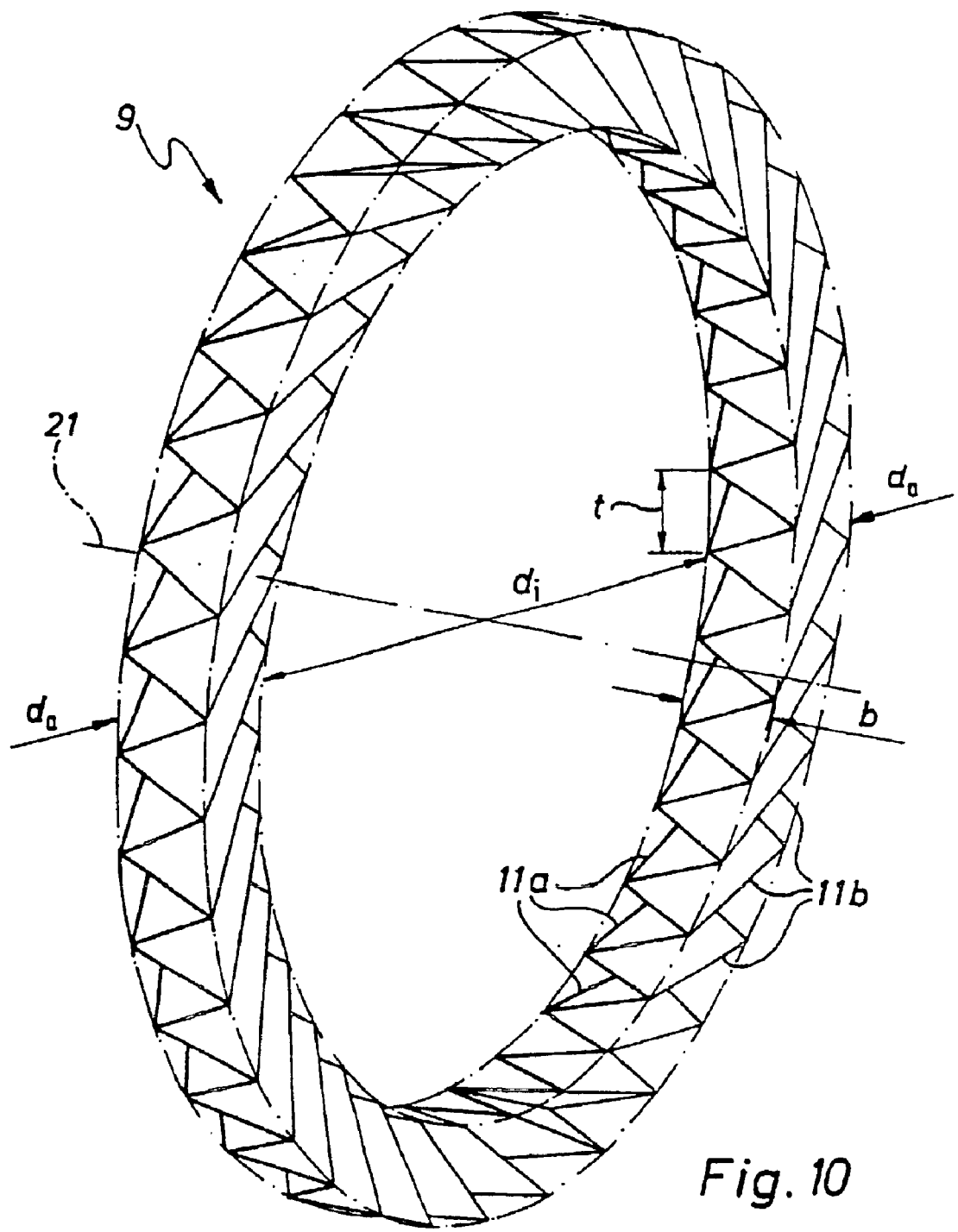
FIG. 10 is a perspective view of a further exemplary embodiment of a rotor seal according to the invention.

FIG. 10 provides a perspective illustration of a further exemplary embodiment of a rotor seal according to the invention. This illustration clearly indicates that folded edges 11a lie in a plane that runs perpendicular to the rotor axis 21. The folded edges 11b likewise lie in a plane that runs perpendicular to the rotor axis 21. The two planes run parallel to and at a distance from one another, the distance corresponding to a width b of the folding strip 9.

If the folding strip 9 is fitted to the turbine housing 1, it is not additionally subjected to loads and deformation by centrifugal forces. At the internal diameter $d_i$, the folding strip 9 is elastic in the radial direction. At its external diameter $d_a$, the folding strip 9 is connected in a sealed manner to a turbine housing. The setting angle $\gamma$, which cannot be shown in FIG. 10 on account of the perspective illustration, is partially responsible for determining the rigidity of the folding strip 9 in the radial direction.

It may be advantageous if the width b is slightly greater than the pitch t measured at the internal diameter $d_i$. The free height of the folding strip is determined by the radial elasticity required.

Finally, it should also be mentioned that the folding strip 9 can also be applied so as to act axially in the same way.

Moreover, for some situations, on account of a low centrifugal force action, it is acceptable for the folding strip 9 to be secured to the rotor 2. This may even be desirable, if it is necessary for the centrifugal force acting on the folding strip 9 to be utilized in such a manner that the definitive gap width is only established when the full rotational speed is reached. This would provide the option of having greater gap widths when a turbomachine is being started up and when passing through the critical speed, which in turn significantly increases the operational reliability.

All the features which have been disclosed in the description, the drawing and the patent claims may be pertinent to the invention both individually and in any desired combination with one another.

I claim:

1. A rotor seal for sealing a sealing gap present between a stationary housing and a rotor that rotates relative to the stationary housing, the rotor seal comprising:
    a folding strip being folded into a plurality of sealing elements disposed one behind another other in a circumferential direction of the rotor, the folding produces folded edges and said folded edges, in an installed state of said folding strip, run in a plane lying perpendicular to a rotor axis, said folding strip having a given width and a slit formed therein provided in a region of said folded edges, said slit having a depth less than said given width of said folding strip.

2. The rotor seal according to claim 1, wherein said folding strip has two parallel longitudinal edges.

3. The rotor seal according to claim 2, wherein said folded edges are parallel folded edges, and the folding takes place in an opposite direction at two adjacent ones of said folded edges.

4. The rotor seal according to claim 3, wherein said two parallel longitudinal edges of said folding strip and said parallel folded edges have a production angle of lees than 90°.

5. The rotor seal according to claim 1, wherein in said installed state said folded edges have a setting angle of between 10° and 70° with a radius which originates from the rotor axis.

6. The rotor seal according to claim 1, further comprising a carrier ring disposed on an end of said folding strip remote from the sealing gap.

7. The rotor seal according to claim 6, wherein said carrier ring has a sealing lip.

8. The rotor seal according to claim 6, wherein said folding strip is one of soldered, welded and connected in a form locking manner to said carrier ring.

9. The rotor seal according to claim 1, wherein said folding strip is formed of a metallic material.

10. The rotor seal according to claim 1, wherein said folding strip is plastically deformable in a region of said folded edges, and said folding strip is otherwise resilient.

11. The rotor seal according to claim 1, wherein said folding strip is soft-annealed in a region of said folded edges.

12. The rotor seal according to claim 11, further comprising a seal carrier and said folding strip, in a folded state, is connected to said seal carrier in one of a form-locking manner, a force-locking manner, and a material-to-material bonding.

13. The rotor seal according to claim 12, wherein:
    said seal carrier has a suitably shaped annular groove formed therein; and
    said folding strip has recesses formed therein in a region of each of said folded edges, said recess can be connected in a form-locking manner to said annular groove.

14. The rotor seal according to claim 12, wherein said seal carrier has multi-part configuration.

15. The rotor seal according to claim 14 wherein said seal carrier has a parting plane running substantially parallel to said folded edges disposed in a region of said parting plane.

16. The rotor seal according to claim 12, wherein said seal carrier is disposed on the stationary housing.

17. The rotor seal according to claim 12, wherein said seal carrier is disposed at the rotor.

18. The rotor seal according to claim 1, wherein the rotor seal is a radial seal.

19. The rotor seal according to claim 1, wherein the rotor seal is an axial seal.

20. The rotor seal according to claim 1, wherein said folding strip is one of a plurality of folding strips, each folded folding strip forms a segment, and said plurality of folding strips form a plurality of segments.

21. The rotor seal according to claim 5, wherein said setting angle is between 20° and 45°.

22. The rotor seal according to claim 1, wherein the rotor seal is for a turbomachine.

* * * * *